May 3, 1960

D. D. ASKE 2,935,361

ORNAMENTAL DISC FOR WHEELS

Filed July 12, 1957

INVENTOR.

DONALD D. ASKE

BY Jack W. Hicks

ATTORNEY 2,935,361

ORNAMENTAL DISC FOR WHEELS

Donald D. Aske, Albert Lea, Minn.

Application July 12, 1957, Serial No. 671,464

2 Claims. (Cl. 301—37)

My invention relates to an improvement in decorative devices for wheels and more particularly to a wheel disc mounted concentrically of the axle of the wheel.

It is a primary object of my invention to provide a wheel disc which is mounted closely adjacent the wheel and concentrically therewith but which does not rotate with the wheel. It is also an object of my invention to provide a wheel disc on which indicia or decorative articles may be mounted, the disc and mounting thereon remaining stationary and recognizable while the wheel rotates.

It is still a further object to provide a wheel disc having a new and novel means for mounting the wheel disc whereby the same does not rotate with the wheel.

I shall not here attempt to set forth and indicate all of the various objects and advantages incident to my invention, but other objects and advantages will be referred to in or else will become apparent from that which follows.

The invention will appear more clearly from the following description when taken in connection with the accompanying drawings, showing by way of example a preferred embodiment of the inventive idea wherein like numerals refer to like parts throughout.

In the drawings forming part of this application:

Figures 1, 2, 3, 4, 5:
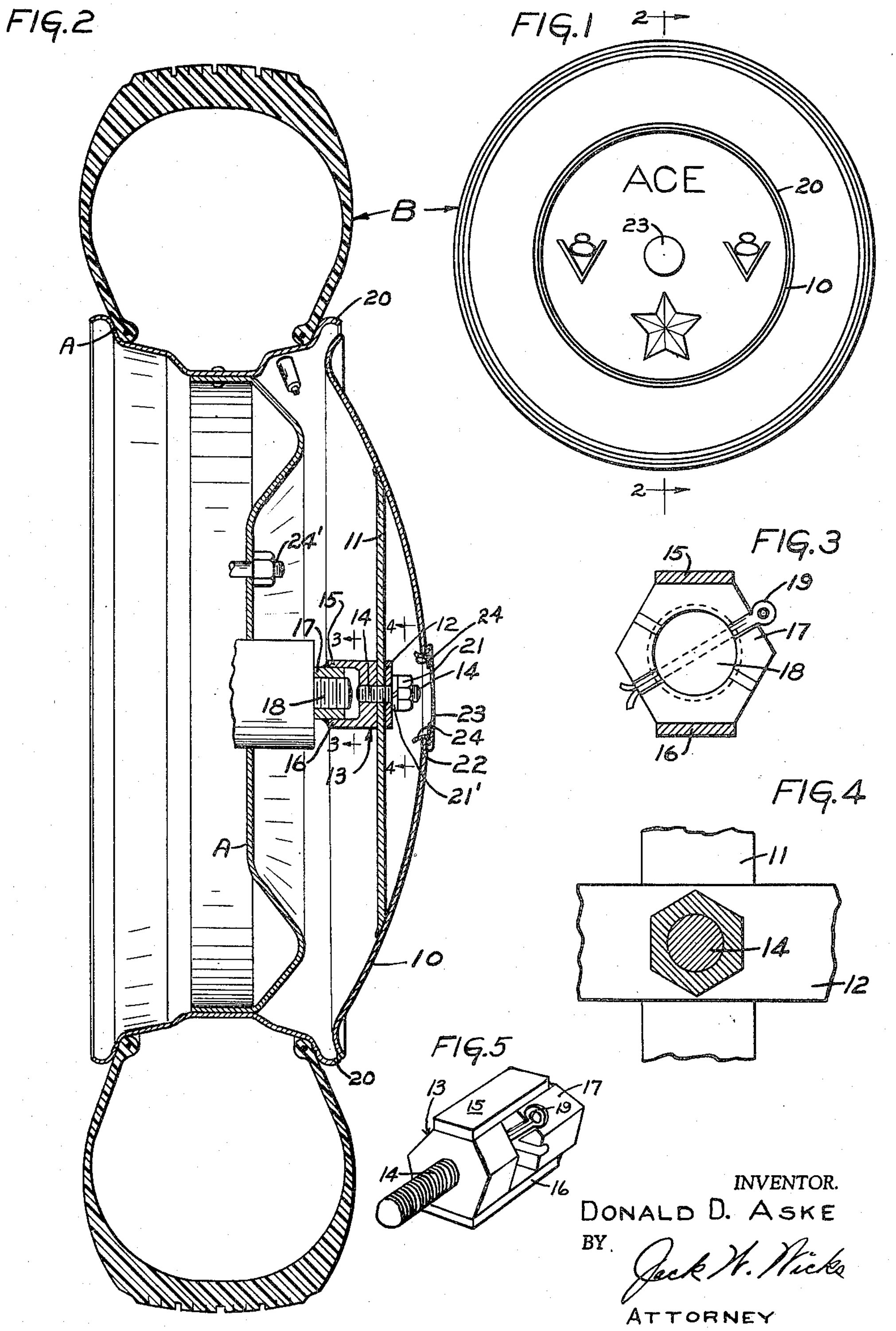
Figure 1 is a front view of my wheel disc in position on a wheel commonly used on an automobile.
Figure 2 is a sectional view taken on the line 2—2 of Figure 1.
Figure 3 is a sectional view taken on the line 3—3 of Figure 2.
Figure 4 is a sectional view on the line 4—4 of Figure 2.
Figure 5 is a perspective view of the mounting head and connecting nut removed from the spindle of the wheel.

Referring to the drawings in detail my wheel disc and the mounting therefor includes the disc member 10 which is "dished" in formation. The disc 10 is generally conventional in form and is positioned concentrically of the wheel A to give a more desirable appearance to the same by covering up the wheel.

The disc member 10 has secured to the inside surface thereof the flat bar 11 which is positioned on a diameter of the disc 10. Further provided is the flat bar 12 also secured to the inside surface of the disc 10 and positioned on a diameter of the disc in intersecting contact with the flat bar 11 the central portion of which is spaced from the disc 10. The bars 11 and 12 are drilled at the point of intersection to receive the threaded stub hereinafter described. The numeral 13 designates a threaded support member which has connected to and extending therefrom the threaded stud 14.

The support member 13 also has connected thereto and extending rearwardly therefrom the short upper bar 15 and the short lower bar 16 parallelly disposed. The inner ends of the short bars 15 and 16 are secured to the conventional spindle or axle nut 17 which is threadedly mounted on the outer end of the wheel spindle or axle 18. The nut 17 is spaced from the support member 13 so that the outer end of the spindle 18 will not come in contact with the inner surface of the support member 13 when the nut 17 is drawn up on the spindle. The nut 17 is secured on the spindle 18 by means of the conventional cotter pin 19. The disc 10 is of a diameter whereby the outer peripheral edge thereof is spaced slightly from the outer peripheral edge of the wheel rim edge 20. Also the length of the short bars 15 and 16 is such that the disc 10 is positioned closely adjacent the outer edge of the wheel rim edge 20. Mounted on the wheel A is the conventional tire B.

The numeral 21 designates a nut which is threadedly mounted on the threaded stud 14. I further provide the circular opening 22 formed centrally of the disc 10 and the circular plug 23 which removably snaps into the opening 22 and engages the disc 10 by means of the small ears 24.

It is apparent that the support made up of the bars 11 and 12 which support the disc 10 on the support 13 may be of a circular construction or other formation but that the inventive concept would remain the same. The wheel A is mounted on the conventional brake drum by means of the conventional lugs 24′.

In mounting my discs 10, the conventional spindle nut is removed, and the nut portion 17 is drawn up on the spindle 18 to proper position whereby the support member 13 is properly positioned. Then the threaded stud 14 is placed through the hole formed through the bars 11 and 12 at the intersection thereof with the bar 11 up against the outer end of the support 13. At this point the nut 21 together with the washer 21′ is drawn upon the bar 12 to thereby mount the disc 10 upon the spindle 18. The small circular cap 23 is snapped into place. The spindle 18 is stationary even though the wheel A is rotating, and with my disc secured to said spindle the same is stationary while the wheel rotates. As a result of the above a new and desirable effect is obtained, and the indicia such as "Age" on the wheel of Figure 1 remains stationary and readable as the wheel A rotates.

I have thus provided a new and novel disc for wheels thereby the disc remains stationary while the wheel rotates as a result of my new construction.

The invention is not to be understood as restricted to the details set forth, since these may be modified within the scope of the appended claims without departing from the spirit and scope of the invention.

Having thus described the invention, that which I claim as new and desire to secure by Letters Patent is:

1. In an ornamental disc for wheel decoration, a circular body member, a support member having a threaded stud mounted on the outer portion thereof, said support member having a nut connected to the inner portion thereof for engagement with the axle of a vehicle, radically extending supporting means connected to the inner surface of said circular body member, said radially extending supporting means having an opening substantially centrally thereof for receiving said stud of said support member, a nut for engagement with said stud to secure said radially extending supporting means on said stud and against said support member, and said circular body member having an opening therein for access to said nut on said stud, and a closure member for said opening.

2. In an ornamental disc for wheel decoration, a substantially circular body member having a dished formation, a radially extending support member secured to the inner surface of said circular body member with the central portion thereof spaced from the inner surface, a support member, a nut, means connecting said support member with said nut in spaced axially alignment, a threaded stud connected to said support member, a hole formed centrally in said radially extending support member adapted to receive said stud, threaded means for securing said radially extending support upon said stud, and means on said body member concentric with said threaded means for allowing access to said threaded means.

References Cited in the file of this patent

UNITED STATES PATENTS

| | | |
|---|---|---|
| 2,754,154 | Solow | July 10, 1956 |
| 2,759,282 | Le Court | Aug. 21, 1956 |

FOREIGN PATENTS

| | | |
|---|---|---|
| 281,602 | Great Britain | Feb. 23, 1928 |